(12) United States Patent
Sato

(10) Patent No.: US 6,488,065 B1
(45) Date of Patent: Dec. 3, 2002

(54) PNEUMATIC RADIAL TIRE

(75) Inventor: Takayuki Sato, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/468,077

(22) Filed: Dec. 21, 1999

(30) Foreign Application Priority Data

Dec. 21, 1998 (JP) .......................................... 10-362105
Dec. 22, 1998 (JP) .......................................... 10-363893

(51) Int. Cl.$^7$ ................................................. B60C 9/08
(52) U.S. Cl. ....................................... 152/539; 152/527
(58) Field of Search .................................. 152/539, 451, 152/526, 527, 517, 540, 544, 548, 551, 555; 57/902, 236, 237

(56) References Cited

U.S. PATENT DOCUMENTS

| | | | |
|---|---|---|---|
| 5,263,526 A | * 11/1993 | Oare et al. | 152/540 |
| 5,368,082 A | * 11/1994 | Oare et al. | 152/517 |
| 5,743,975 A | * 4/1998 | Sinopoli et al. | 152/527 |
| 5,855,704 A | * 1/1999 | Reuter | 152/527 |
| 6,026,879 A | * 2/2000 | Reuter | 152/527 |
| 6,135,183 A | * 10/2000 | Oare et al. | 152/517 |

FOREIGN PATENT DOCUMENTS

| | | |
|---|---|---|
| DE | 3604528 A1 | 8/1986 |
| EP | 0 707 986 A2 | 4/1996 |
| JP | 5-163612 | 6/1993 |
| WO | 98/56599 | 12/1998 |

* cited by examiner

*Primary Examiner*—Edward J. Cain
*Assistant Examiner*—Wyrozebski Lee
(74) *Attorney, Agent, or Firm*—Sughrue Mion, PLLC

(57) ABSTRACT

A pneumatic radial tire comprises a pair of bead portions, a pair of sidewall portions, a tread portion, a radial carcass toroidally extending between a pair of bead cores and comprised of at least one rubberized ply containing organic fiber cords therein, and a belt superimposed about a crown portion of the carcass and comprised of at least two cross belt layers, wherein the organic fiber cord used in the carcass is a double-twisted polyester cord of 1000–10000 dtex having dynamic moduli at tensions of 200 g and 1500 g within specified ranges.

5 Claims, 3 Drawing Sheets

Comparative

PNEUMATIC RADIAL TIRE

BACKGROUND OF THE INVENTION

1. Field of the Invention

This invention relates to a pneumatic radial tire using polyester cords in a carcass and more particularly to a pneumatic radial tire for passenger car simultaneously improving a steering stability and a ride comfort against vibration without sacrificing a durability.

2. Description of Related Art

In general, the steering stability and ride comfort against vibration are considered to be most important performances as a property required in the pneumatic radial tire for passenger car. Recently, the running performances of vehicles mainly running on paved road, particularly passenger cars are improved every year and used under good maintenance, and also the road system is more expanded, so that it is demanded to more improve the running performances, particularly steering stability of a tire used for such a vehicle. Furthermore, as the ride comfort of the passenger car is improved with the servicing of road surface, it is strongly demanded to improve ride comfort against vibration when the tire rides on projections such as asphalt joints in a bridge or an expressway and so on.

For this end, various examinations and developments are made for satisfying these performances. Among them, cords of polyethylene terephthalate fiber (PET) having a relatively high modulus at an initial tension as a polyester cord are usually and widely used in a carcass of the radial tire for passenger car. In this case, however, a stiffness of a sidewall portion in the tire becomes high, which badly affects the ride comfort against vibration. Furthermore, the carcass containing such PET cords therein can not sufficiently respond to the demand for the steering stability and ride comfort accompanied with the improvement of the performances of the vehicle.

In order to improve the steering stability and ride comfort of the tire, it is advantageous to make the carcass tough or to enhance the modulus of the cord constituting the carcass. Therefore, it is considered that polyethylene naphthalate fiber cord (PEN cord) having a higher modulus of elasticity is used instead of the existing PET cord among the polyester fiber cords as a cord constituting the carcass. However, the PEN cord is poor in the fatigue resistance because the modulus of elasticity is higher than that of the conventional PET cord, so that when the PEN cord is used in the carcass, it is feared that the durability of the tire is not guaranteed.

SUMMARY OF THE INVENTION

It is, therefore, an object of the invention to provide a pneumatic radial tire simultaneously improving the steering stability and the ride comfort against vibration by using polyester cords having specified properties in the carcass of the tire without sacrificing the durability.

The inventor has made various studies with respect to the steering stability and ride comfort against vibration of the tire when the polyester cords having specified properties are used in the carcass of the radial tire and found that the steering stability and the ride comfort against vibration can simultaneously be improved by controlling dynamic stiffness of the tire. That is, it has been confirmed that tension applied to the carcass is high in the sidewall portion and low in the tread portion owing to the presence of the belt even when the internal pressure or the structure of the tire is same.

As a result, the invention has been accomplished by masking the dynamic modulus of the polyester cord used in a carcass ply lower at a low tension and higher at a high tension as compared with that of the conventional PET cord. Furthermore, the inventor has made studies with respect to the fatigue resistance and the tire durability and found the following facts:

(a) In general, the organic fiber cord hardly causes fatigue at tensile strain but causes fatigue at compression strain;

(b) The compression strain is applied to a turnup portion of the carcass ply wound around a bead core from an inside of the tire toward an outside thereof;

(c) The compression strain in the turnup portion becomes smaller as the bending of the bead portion becomes small when a load is applied to the tire;

(d) In case of a tire having a small aspect ratio, the stiffness is high and the bending of the bead portion is small, so that strain applied to the turnup portion is small, which are advantageous in the fatigue resistance of the cord in the carcass; and (e) As the stiffness of the bead portion becomes high, the deformation of the sidewall portion is gentle and strain applied to the cord in the carcass decreases.

The invention is based on the above knowledge.

According to the invention, there is the provision of in a pneumatic radial tire comprising a pair of bead portions, a pair of sidewall portions, a tread portion, a radial carcass toroidally extending between a pair of bead cores embedded in the bead portions and comprised of at least one rubberized ply containing organic fiber cords therein, and a belt superimposed about a crown portion of the carcass and comprised of at least two belt layers containing steel cords arranged at a given cord angle with respect to an equatorial plane of the tire, an improvement wherein the organic fiber cord used in the carcass is a double-twisted polyester cord of 1000–10000 dtex having a dynamic modulus at a tension of 200 g of $4 \times 10^{10}$–$6 \times 10^{10}$ dyn/cm$^2$ and a dynamic modulus at a tension of 1500 g of $6 \times 10^{10}$–$9 \times 10^{10}$ dyn/cm$^2$.

In a preferable embodiment of the invention, the polyester cord is a polyethylene naphthalate fiber cord.

In another preferable embodiment of the invention, the tire has an aspect ratio of not more than 65%.

In the other preferable embodiment of the invention, the bead core is formed by helically winding a steel wire having a diameter of 1.2–1.8 mm 7–30 times.

BRIEF DESCRIPTION OF THE DRAWINGS

The invention will be described with reference to the accompanying drawings, wherein.

DESCRIPTION OF PREFERRED EMBODIMENTS

Figure 1:
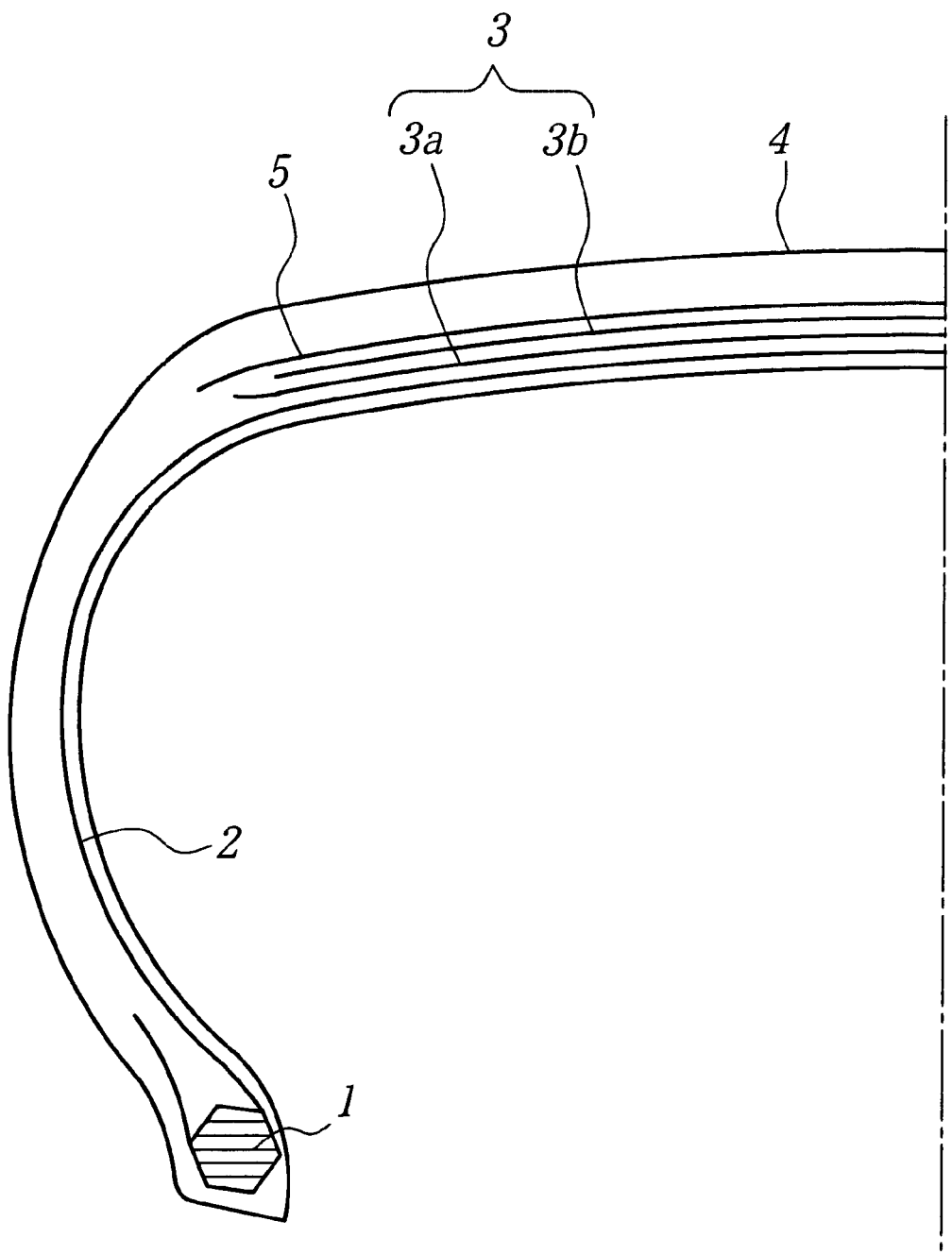
FIG. 1 is a diagrammatically left-half section view of an embodiment of the pneumatic radial tire according to the invention.

In order to simultaneously improve the steering stability and the ride comfort in the pneumatic radial tire according to the invention, it is required that the double-twisted polyester cord after an adhesion treatment has a dynamic modulus at a tension of 200 g of $4 \times 10^{10}$–$6 \times 10^{10}$ dyn/cm$^2$, preferably $4 \times 10^{10}$–$5 \times 10^{10}$ dyn/cm$^2$. When such a dynamic modulus is less than $4 \times 10^{10}$ dyn/cm$^2$, the steering stability is not improved, while when it exceeds $6\times10^{10}$ dyn/cm$^2$, the ride comfort is not improved.

And also, the double-twisted polyester cord is required to have a dynamic modulus at a tension of 1500 g of $6\times10^{10}$–$9\times10^{10}$ dyn/cm$^2$, preferably $6.5\times10^{10}$–$9\times10^{10}$ dyn/cm$^2$. When such a dynamic modulus is less than $6\times10^{10}$ dyn/cm$^2$, the steering stability is not improved, while when it exceeds $9\times10^{10}$ dyn/cm$^2$, the ride comfort is not improved.

Furthermore, the double-twisted polyester cord according to the invention has 1000–10000 dtex, preferably 2000–5000 dtex per one cord. Such cords are favorably used in the carcass in view of the balance between tire weight and tire performance. When the cord of less than 1000 dtex is used, the carcass is necessary to be comprised of several plies for holding a given tire strength, which brings about the increase of the tire production cost. While, when the cord of more than 10000 dtex is used, the thickness of the carcass unnecessarily increases to bring about the increase of the tire weight.

As a material of the polyester cord, there are polyethylene terephthalate and polyethylene naphthalate represented by polyethylene-2,6-naphthalate (see JP-A-5-163612). Among them, only the polyethylene naphthalate cord (PEN cord) satisfies the above properties. In the PEN cord, the given properties are relatively easily obtained by changing the twisting number of the cord or conditions at a heat treating step (dipping step) for applying an adhesion in the course of the tire production. That is, the dynamic modulus at high tension can be rendered into the given range by using the PEN cord, while in order to obtain the given range of the dynamic modulus in this cord at low tension, it is favorable that the twisting number is made higher than that of the usual polyethylene naphthalate cord for the tire and the cord is subjected to a dipping treatment at a low tension as a condition for the adhesion treatment. For this end, the twisting coefficient NT for the PEN cord is favorable to be 0.45–0.60. Moreover, the term "twisting coefficient" used herein is defined by the following equation:

$$NT=T\times(0.125\times D/2\times 1/\rho)^{1/2}10^{-3}$$

wherein T is a twisting number (turns/10 cm), and D is a total dtex, and $\rho$ is a specific gravity. The specific gravity $\rho$ of polyethylene naphthalate is 1.362.

The dipping treatment of the cord is preferable to be usual one-bath treatment or such a heat treatment that the cord applied with the adhesive through the one-bath treatment is treated in a dry zone at a temperature of about 150–200° C. for a time of about 30–120 seconds, in a heat set zone and a normalizing zone at a temperature of about 240–270° C. for a time of 30–120 seconds, and further a cord tension is 300–1500 g/cord in the heat set zone and 300–1500 g/cord in the normalizing zone.

Moreover, the dynamic modulus of the polyester cord used in the invention is measured by a method mentioned later, or may be measured after the cord is taken out from the product tire. In the latter case, it is necessary that the measurement is carried out by removing rubber adhered to the cord with a solvent or the like as complete as possible in order to eliminate the influence of rubber adhered to the cord.

In the invention, polyethylene naphthalate (PEN) as a material for PEN cord is enough to contain not less than 90 mol % of ethylene-2,6-naphthalate unit. That is, PEN may be a polymer containing less than 10 mol % of a proper third component. In general, polyethylene-2,6-naphthalate is synthesized by polycondensing naphthalene-2,6-dicarboxylic acid or an ester forming derivative thereof with ethylene glycol in the presence of a catalyst under proper reaction conditions. In this case, a copolymerized polyester can be synthesized by adding one or more third components before the completion of the polymerization.

As the third component, mention may be made of (a) compounds having two ester-forming functional groups, for example, aliphatic dicarboxylic acids such as oxalic acid, succinic acid, adipic acid, sebacic acid, dimer acid and the like; alicyclic dicarboxylic acids such as cyclopropane dicarboxylic acid, cyclobutane dicarboxylic acid, hexahydroterephthalic acid and the like; aromatic dicarboxylic acids such as phthalic acid, isophthalic acid, naphthalene-2,7-dicarboxylic acid, diphenyl dicarboxylic acid and the like; diphenylether dicarboxylic acid, diphenylsulphone dicarboxylic acid, diphenoxyethane dicarboxylic acid, sodium 3,5-dicarboxybenzene sulphonate and the like; oxycarboxylic acids such as glycolic acid, p-oxybenzoic acid, p-oxyethoxy benzoic acid and the like; oxy compounds such as propylene glycol, trimethylene glycol, diethylene glycol, tetramethylene glycol, hexamethylene glycol, neopentylene glycol, p-xylene glycol, 1,4-cyclohexane dimethanol, bisphenol-A, p,p'-dihydroxydiphenyl sulphone, 1,4-bis($\beta$-hydroxyethoxy) benzene, 2,2-bis(p-$\beta$-hydroxyethoxyphenyl) propane, polyalkylene glycol and the like; functional derivatives thereof; high-polymerized compounds induced from the above carboxylic acids, oxycarboxylic acids, oxy compounds and functional derivatives thereof, and (b) compounds having one ester-forming functional group such as benzoic acid, benzyloxy benzoic acid, methoxy polyalkylene glycol and the like.

Further, (c) a compound having 3 or more ester-forming functional groups such as glycerine, pentaerythritol, trimethylol propane or the like may be used as a third component as long as the resulting polymer is substantially linear.

Moreover, PEN may contain a delustering agent such as titanium dioxide or the like, and a stabilizing agent such as phosphoric acid, phosphorous acid or an ester thereof.

In the radial tire according to the invention, it is favorable that an aspect ratio of the tire is not more than 65%. In this case, the sidewall portion bearing the load of the vehicle is high in the stiffness and small in the bending, so that compression strain applied to the cord in the carcass becomes small and hence the fatigue resistance of the cord is enhanced. When the aspect ratio is more than 65%, the bending of the sidewall portion under loading becomes large and there is a fear of exceeding the fatigue of PEN cord over an acceptable value.

When the PEN cord is used in the carcass of the tire having the above aspect ratio, since the PEN cord is high in the dynamic modulus, the stiffness as a whole of the tire is increased to improve the steering stability. Further, rubber in the tread pattern portion, sidewall portion and the like is made soft or the whole of the tire is made soft accompanied with the increase of the stiffness as a whole of the tire, whereby the ride comfort can be improved. That is, the steering stability and the ride comfort of the tire can be improved balancedly.

The belt is comprised of at least two belt layers each containing steel cords therein. Usually, the cords of these belt layers are crossed with each other at a cord angle of 50–75° with respect to the circumferential direction of the tire.

In FIG. 1 is shown an embodiment of the pneumatic radial tire according to the invention. This tire comprises a radial carcass 2 comprised of at least one ply toroidally extending between a pair of bead cores 1 and containing PEN cords therein, a belt 3 superimposed about a crown portion of the carcass 2 in a radial direction and comprised of at least two steel cord layers, and a tread 4 arranged on an outer surface of the belt 3 in the radial direction. In the illustrated embodiment, a belt reinforcing layer 5 formed by helically winding an organic fiber cord in the circumferential direction is arranged between the belt 3 and the tread 4 over a full width of the belt 3.

The carcass 2 is formed by toroidally extending one or two plies of PEN cords radially arranged at an end count of 30–70 cords/5 cm between a pair of bead cores 1 and winding each end portion around the bead core 1 from an inside of the tire toward an outside thereof. In the illustrated embodiment, the belt 3 has a laminated structure of a first steel cord layer 3a and a second steel cord layer 3b viewed from the carcass 2, wherein the steel cords of these layers are crossed with each other and preferably inclined at a cord angle of 22–30° with respect to the cord of the carcass 2.

The bead core 1 is formed by helically winding a steel wire having a diameter of 1.2–1.8 mm 7–30 times because such a structure is advantageous to mitigate the rapid deformation of the sidewall portion. Typical examples of the bead core structure are shown in FIGS. 2 to 5. When the steel wire constituting the bead core 1 has a diameter of less than 1.2 mm or the winding number thereof is 6 times or less as shown in FIG. 6, the sufficient stiffness of the bead portion is not obtained and it is difficult to mitigate the rapid deformation of the sidewall portion. While, when the diameter is exceeds 1.8 mm or the winding number exceeds 30 times, the stiffness of the bead portion becomes too large and it is difficult to conduct the attaching or detaching of the tire against the rim.

The following examples are given in illustration of the invention and are not intended as limitations thereof.

EXAMPLES 1–4

Comparative Examples 1–2

There are provided radial tires of Examples 1–4, Comparative Examples 1–2 and Conventional Example having a tubeless structure and a tire size of 195/65R14, wherein polyethylene naphthalate (PEN) cords are used in Examples 1–4 and Comparative Example 2 and polyethylene terephthalate (PET) cords are used in Comparative Example 1 and Conventional Example as a cord for a carcass, respectively.

In these tires, a carcass is comprised of a single rubberized carcass ply in Examples 1–3, Comparative Examples 1–2 and Conventional Example and comprised of two rubberized carcass plies in Example 4, wherein cords for the carcass are subjected to a dipping treatment as mentioned later and then used at an end count shown in Table 1 in the carcass, and a belt is comprised of two cross belt layers each containing steel cords of 1×5×0.25 structure at an end count of 40 cords/5 cm, wherein a cord angle of a first belt layer with respect to the circumferential direction is 20° upward to the left and a cord angle of a second belt layer is 20° upward to the right, and a belt reinforcing layer containing nylon-6,6 cords of 1400 dtex/2 at a cord angle of 0° with respect to an equatorial plane and an end count of 50 cords/5 cm is disposed on the belt over a full width thereof.

The cords for the carcass are dipped in an aqueous solution having the following composition (1) and further dipped in an aqueous solution having the following composition (2) and then subjected to heating and drawing treatments to obtain cord structure and dynamic modulus as shown in Table 1.

| (1) First dipping solution (part by weight) | |
|---|---|
| soft water | 98.64 |
| diglycerol triglycidyl ether | 1.20 |
| sodium dioctylsulfosuccinate | 0.02 |
| aqueous solution of 10% caustic soda | 0.14 |
| (2) Second dipping solution (part by weight) | |
| soft water | 592.61 |
| resorcin | 18.20 |
| formalin (37%) | 26.90 |
| aqueous solution of 10% caustic soda | 6.60 |
| vinylpyridine latex | 175.65 |
| styrene-butadiene copolymer latex | 180.04 |

Moreover, the dynamic modulus of the dipped cord before the tire building is measured by means of a spectrometer made by Toyo Seiki Co., Ltd. under conditions that a tension is 200 g or 1500 g, a strain stress is 50 g, a temperature is 25° C. and a frequency is 10 Hz.

With respect to these tires, the steering stability and ride comfort are measured by the following method to obtain results as shown in Table 1.

Each of the tires is mounted onto a passenger car having a displacement of 2000 cc and actually run on a test circuit course, during which the steering stability and ride comfort are evaluated by an average of feelings of two professional drivers. The evaluation is represented by 5 point method using the conventional tire as a control, wherein + is good and – is poor and 3 or more points indicate clear difference.

TABLE 1

| | Example 1 | Example 2 | Example 3 | Example 4 | Comparative Example 1 | Comparative Example 2 | Conventional Example |
|---|---|---|---|---|---|---|---|
| Carcass Carcass cord | 1 ply | 1 ply | 1 ply | 2 plies | 1 ply | 1 ply | 1 ply |
| cord material | PEN | PEN | PEN | PEN | PET | PEN | PET |
| cord structure | 1670 dtex/2 | 1670 dtex/3 | 1100 dtex/2 | 1100 dtex/2 | 1670 dtex/2 | 1670 dtex/2 | 1670 dtex/2 |
| dynamic modulus at tension of 200 g | 4.8 | 4.3 | 5.0 | 5.0 | 5.3 | 7.0 | 4.8 |

TABLE 1-continued

|  | Example 1 | Example 2 | Example 3 | Example 4 | Comparative Example 1 | Comparative Example 2 | Conventional Example |
|---|---|---|---|---|---|---|---|
| dynamic modulus at tension of 1500 g | 6.8 | 6.4 | 8.0 | 8.0 | 5.6 | 11 | 5.3 |
| End count of carcass cord (cords/5 cm) | 50 | 40 | 60 | 60 | 50 | 50 | 50 |
| Tire performances |  |  |  |  |  |  |  |
| steering stability | +3 | +3 | +2 | +4 | +0.5 | +4 | 0 |
| ride comfort | +2 | +3 | +4 | +2 | −2 | −3 | 0 |

As seen from table 1, the tires of Comparative examples 1 and 2 improve the steering stability but degrade the ride comfort as compared with those of the conventional tire, while the tires of Examples 1–4 simultaneously and considerably improve the steering stability and ride comfort.

EXAMPLES 5–10

Comparative Examples 3–5

There are provided tires of Examples 5–10 and Comparative Examples 3–5 having a structure as shown in FIG. 1 and various tire sizes shown in Table 2. Moreover, a carcass 2 is comprised of a single rubberized carcass ply containing PEN cords of 1670 dtex/2 at an end count of 50 cords/5 cm, and a belt 3 is comprised of two cross belt layers each containing steel cords of 1×5×0.25 structure at an end count of 40 cords/5 cm, wherein a cord angle of a first belt layer 3a with respect to the circumferential direction is 20° upward to the left and a cord angle of a second belt layer 3b is 20° upward to the right, and a belt reinforcing layer 5 containing nylon-6,6 cords of 1400 dtex/2 at a cord angle of 0° with respect to an equatorial plane and an end count of 50 cords/5 cm is disposed on the belt over a full width thereof.

With respect to these tires, the steering stability, ride comfort and durability are measured by the following methods to obtain results as shown in Table 2.

Each of the tires is mounted onto a passenger car having a displacement of 2000 cc and actually run on a test circuit course, during which the steering stability and ride comfort are evaluated by an average of feelings of two professional drivers with respect to straight running stability, cornering stability, stiffness, handling, vibration property on joints of road, running performance on stone-paved road and the like. The evaluation is represented by 5 point method using the conventional tire as a control, wherein + is good and − is poor and 3 or more points indicate clear difference.

The durability of the tire is evaluated by running each tire on a steel drum having a smooth surface (diameter: 3 m) at a speed of 50 km/h under a load corresponding to 150% of a standard load defined at an internal pressure of 2.0 kgf/cm$^2$ according to JATMA standard to measure a time until the occurrence of trouble. The measured results are represented by an index on the basis that the running time of Comparative example 3 is 100.

TABLE 2

Figure 2:
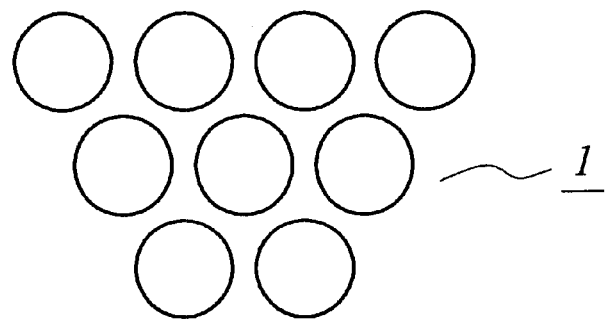
FIGS. 2 to 6 are schematic views of various embodiments of the bead core used in the invention, respectively.
Figure 3:
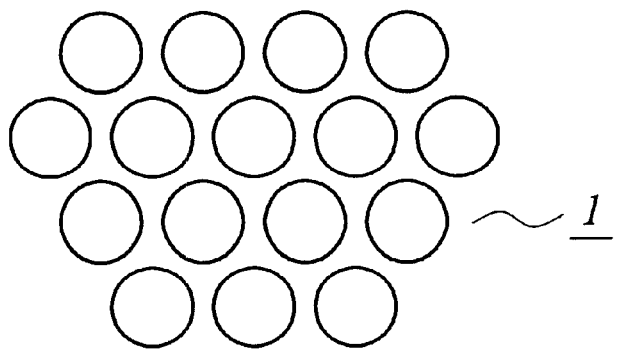
Figure 4:
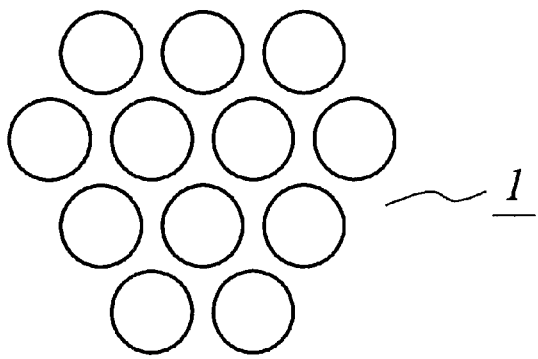
Figure 5:
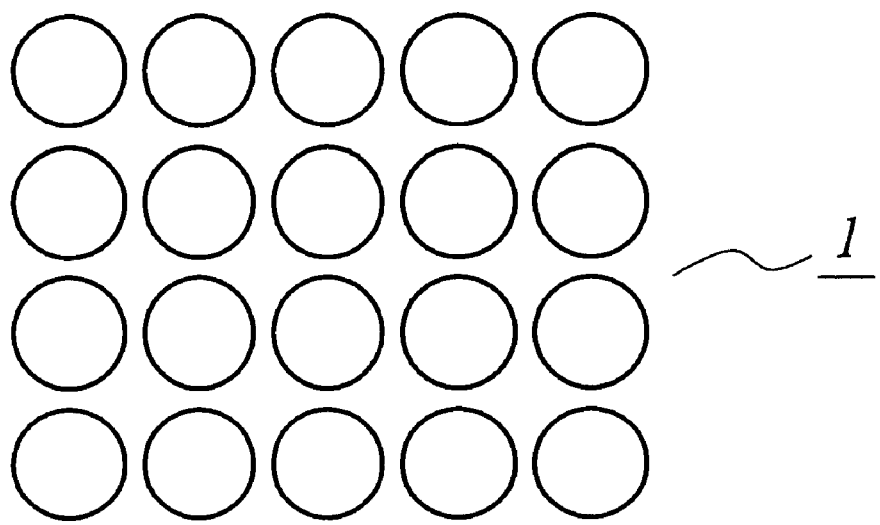
Figure 6:
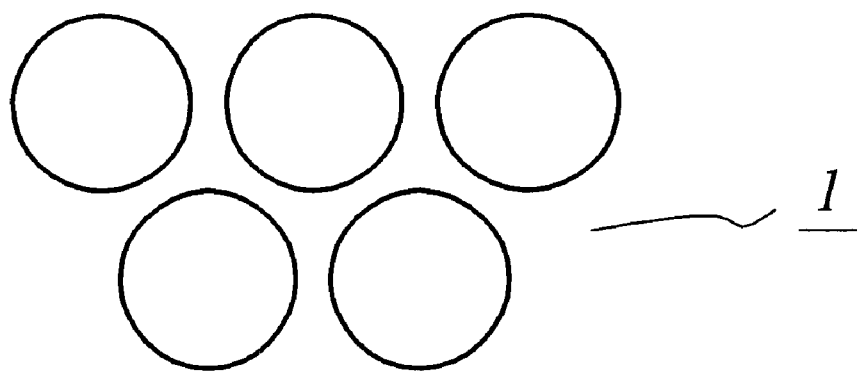

|  | Example 5 | Example 6 | Example 7 | Example 8 | Comparative Example 3 | Comparative Example 4 | Comparative Example 5 | Example 9 | Example 10 |
|---|---|---|---|---|---|---|---|---|---|
| Carcass cord material | PEN | PEN | PEN | PEN | PET | PEN | PEN | PEN | PEN |
| Cord structure (denier, twisting*) | 2 twisting (3600, 42 × 42) | 2 twisting (3600, 42 × 42) | 2 twisting (3600, 42 × 42) | 2 twisting (3600, 42 × 42) | 2 twisting (3600, 40 × 40) | 2 twisting (3600, 42 × 42) | 2 twisting (3600, 42 × 42) | 2 twisting (500, 55 × 55) | 3 twisting (15000, 21 × 21) |
| Tire size | 195/65R14 | 195/65R14 | 195/65R14 | 215/50R15 | 195/65R14 | 175/SR14 | 185/70R14 | 195/65R14 | 195/65R14 |
| Diameter of steel wire in bead core (mm) | 1.5 | 1.9 | 1.2 | 1.5 | 1.0 | 1.5 | 1.0 | 1.5 | 1.5 |
| Bead core structure | FIG. 2, 9 times | FIG. 6, 5 times | FIG. 3, 16 times | FIG. 4, 12 times | FIG. 5, 20 times | FIG. 5, 20 times | FIG. 2, 9 times | FIG. 2, 9 times | FIG. 2, 9 times |
| Steering stability | +3 | +1 | +2 | +5 | 0 | −4 | −4 | +2 | +2 |
| Ride conform | +3 | +3 | +4 | +2 | 0 | −1 | −1 | +3 | +2 |
| Durability | 101 | 100 | 103 | 106 | 100 | 95 | 97 | 101 | 101 |
| Weight (kg) | 8.8 | 8.7 | 8.8 | 10.2 | 8.8 | 7.2 | 7.5 | 8.8 | 9.0 |

*: Twisting is cable twist × ply twist (turns/10 cm)

As mentioned above, according to the invention, the steering stability and the ride comfort of the radial tire for passenger cars can simultaneously be improved without sacrificing the durability by using PEN cords having specified properties in the carcass of the tire instead of the conventional PET cords.

What is claimed is:

1. A pneumatic radial tire comprising; a pair of bead portions, a pair of sidewall portions, a tread portion, a radial carcass toroidally extending between a pair of bead cores embedded in the bead portions and comprised of at least one rubberized ply containing organic fiber cords therein, and a belt superimposed about a crown portion of the carcass and comprised of at least two belt layers containing steel cords arranged at a given cord angle with respect to an equatorial plane of the tire, and the organic fiber cord for the at least one rubberized carcass ply is a double-twisted polyester cord of 1000–10000 dtex having a dynamic modulus at a tension of 200 g of $4 \times 10^{10}$–$6 \times 10^{10}$ dyn/cm$^2$ and a dynamic modulus at a tension of 1500 g of $6 \times 10^{10}$–$9 \times 10^{10}$ dyn/cm$^2$.

2. A pneumatic radial tire according to claim 1, wherein the polyester cord is a polyethylene naphthalate fiber cord.

3. A pneumatic radial tire according to claim 1, wherein the tire has an aspect ratio of not more than 65%.

4. A pneumatic radial tire according to claim 1, wherein the bead core is formed by helically winding a steel wire having a diameter of 1.2–1.8 mm 7–30 times.

5. A pneumatic radial tire according to claim 1, wherein the double-twisted polyester cord has a twisting coefficient NT of 0.45–0.60.

* * * * *